United States Patent
Iwaki et al.

(10) Patent No.: US 9,294,750 B2
(45) Date of Patent: Mar. 22, 2016

(54) VIDEO CONVERSION DEVICE, PHOTOGRAPHY SYSTEM OF VIDEO SYSTEM EMPLOYING SAME, VIDEO CONVERSION METHOD, AND RECORDING MEDIUM OF VIDEO CONVERSION PROGRAM

(71) Applicant: FUJIFILM Corporation, Tokyo (JP)

(72) Inventors: Yasuharu Iwaki, Tokyo (JP); Mitsuhiro Uchida, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/052,185

(22) Filed: Oct. 11, 2013

(65) Prior Publication Data
US 2014/0036105 A1   Feb. 6, 2014

Related U.S. Application Data

(63) Continuation of application No. PCT/JP2012/059806, filed on Apr. 10, 2012.

(30) Foreign Application Priority Data

Apr. 11, 2011 (JP) ................................. 2011-087801

(51) Int. Cl.
*H04N 11/20* (2006.01)
*H04N 9/67* (2006.01)
(Continued)

(52) U.S. Cl.
CPC ............. *H04N 11/20* (2013.01); *H04N 1/6052* (2013.01); *H04N 5/235* (2013.01); *H04N 9/67* (2013.01)

(58) Field of Classification Search
CPC ....... H04N 11/20; H04N 5/235; H04N 5/228; H04N 9/67; H04N 1/6052; H04N 21/233; H04N 21/23418; H04N 21/235; H04N 21/435; H04N 21/812; H04N 21/84; H04N 21/8456; H04N 1/6058; H04N 1/6088; H04N 1/00132; H04N 1/00198; G06T 11/206; G06T 11/60; G09G 2320/0626; G09G 2320/0666; G09G 2320/0693; G09G 2320/0673; G09G 5/02; G11B 27/28; G11B 27/034; G11B 27/105; G11B 27/3036; G11B 27/34; G11B 27/031; G11B 2220/216; G11B 2220/2525; G11B 2220/2537
USPC ........................ 348/223.1, 239; 386/278–290
See application file for complete search history.

(56) References Cited

U.S. PATENT DOCUMENTS

2004/0125877 A1 * 7/2004 Chang ............... G06F 17/30787
375/240.28

(Continued)

FOREIGN PATENT DOCUMENTS

| JP | 2008-295034 | 12/2008 |
|----|-------------|---------|
| JP | 2010-055029 | 3/2010 |
| WO | 2008085150 | 7/2008 |

OTHER PUBLICATIONS

International Preliminary Report on Patentability (IPRP); International Application No. PCT/JP2012/059806; and International Filing Date Apr. 10, 2012.

(Continued)

*Primary Examiner* — Pritham Prabhakher
(74) *Attorney, Agent, or Firm* — Young & Thompson

(57) ABSTRACT

A video conversion unit comprises: a unit which acquires a camera video data signal; a first color conversion unit which converts the camera video data signal to a photography scene reference color space and derives first video data; a lock modification section which carries out a lock modification on the first video data; a second color conversion unit which converts the post-color conversion video data to a video output reference color space and derives second video data; and a third color space conversion unit which converts the second video data to a color space of a verification display device and derives third video data in order to pre-verify a device color which is obtained when converting to a color space of a final video output device with a different display device.

15 Claims, 11 Drawing Sheets

(51) Int. Cl.
*H04N 5/235* (2006.01)
*H04N 1/60* (2006.01)

(56) References Cited

U.S. PATENT DOCUMENTS

| | | | | |
|---|---|---|---|---|
| 2005/0025454 A1* | 2/2005 | Nakamura | ............ | G11B 27/031 386/280 |
| 2005/0175260 A1* | 8/2005 | Takahashi | ................ | G06T 11/60 382/309 |
| 2006/0066628 A1* | 3/2006 | Brodie | .................... | G06T 11/00 345/594 |
| 2006/0156364 A1* | 7/2006 | Shinkai | ......................... | 725/115 |
| 2006/0267985 A1* | 11/2006 | Brodie | .................. | G06T 11/206 345/442 |
| 2010/0053426 A1 | 3/2010 | Kawada | | |
| 2010/0085480 A1 | 4/2010 | Katakame | | |
| 2010/0265264 A1 | 10/2010 | Doser et al. | | |
| 2010/0302404 A1* | 12/2010 | Mizukura | ................ | H04N 9/67 348/222.1 |

OTHER PUBLICATIONS

International Search Report, PCT/JP2012/059806, Jul. 17, 2012.
Extended European search report, dated Aug. 11, 2014, in corresponding European Patent Application No. 12771839.3.
Christopher J. Clark: "Investigation of the Academy's Image Interchange Framework at ROT", Mar. 21, 2010, XP055132509, Retrieve from the Internet: URL: https://cias.rit.edu/media/uploads/gallery-projects/178/documents/3/academy-iif-at-rit.pdf [retrieved on Jul. 30, 2014].

* cited by examiner

FIG. 8

VIDEO CONVERSION DEVICE, PHOTOGRAPHY SYSTEM OF VIDEO SYSTEM EMPLOYING SAME, VIDEO CONVERSION METHOD, AND RECORDING MEDIUM OF VIDEO CONVERSION PROGRAM

CROSS REFERENCE TO RELATED APPLICATIONS

This application is a Bypass continuation of PCT/JP2012/059806 filed on Apr. 10, 2012, which claims foreign priority to Japanese Application No. 2011-087801 filed on Apr. 11, 2011. The entire contents of each of the above applications are hereby incorporated by reference.

BACKGROUND OF THE INVENTION

The present invention relates to a video conversion device, a photography system for a motion picture system employing the same, a video conversion method, and a recording medium with such a video conversion program recorded thereon, and more particularly, to a video conversion device which can streamline color designing and adjusting work performed in the course of video production, that is, in the course of motion picture production or TV program production and which can check colors in a final display device reproduced from camera video data captured using plural cameras particularly at a shooting location of a motion picture system, a video conversion method, a photography system for a motion picture system using the video conversion device, and a computer-readable recording medium having recorded thereon a video conversion program causing a computer to perform the video conversion method.

Conventionally, in a motion picture system, a recording medium such as a positive film for screening (distribution film for screening) used for a film projector or a hard disk for screening (portable distribution hard disk for screening) having recorded thereon video data for screening used for a digital projector has been produced to screen a motion picture using a projector.

Conventionally, in a motion picture production workflow of producing the positive film for screening or the hard disk for screening, digital video data obtained by reading and digitalizing a photographed and developed negative film for video shooting by the use of an image input device such as a telecine machine, digital video data obtained by capturing an image by the use of a digital imaging camera for cinematography, or digital video data of computer graphics (CG) produced by the use of a computer or the like is acquired under directions of a director of photography, the acquired digital video data is subjected to digital video processing, editing, and color correction and also visual and auditory senses are added thereto in an editing process which is a post process after shooting (post production) to prepare video data after editing and processing, that is, video source data, and the video source data is output to a positive film for screening via an intermediate negative film and projected by the use of a film projector, or the video source data is converted into output data which is output to a hard disk for screening or the like or directly distributed and projected by the use of a digital projector (see Patent Literature 1).

Patent Literature 1 discloses video conversion method and device in a motion picture system which can simply perform correction of video characteristics such as color correction of a video signal obtained through electronic imaging using a video camera, similarly to a case where a video signal obtained using a cinema film is processed.

Patent Literature 2 does not relate to a motion picture system but discloses image processing apparatus and method in which the image processing apparatus is connected to a display apparatus to transmit thereto image information, acquires or selects reproducibility characteristic information of the connected display apparatus, and converts the image information utilizing the acquired reproducibility characteristic information such that accurate color image is reproduced by the display apparatus.

Meanwhile, the post process of video production (post production) which is an editing process after shooting is generally a cooperative work among various persons such as a director of photography, a producer and a colorist, or various companies and requires transmitting data between persons or between companies and designing the overall processes extending over persons or extending over companies. However, since data formats or image conversion workflows do not have any standard, supplemental work such as format conversion or color space conversion is necessary, thereby causing an increase in work complexity, a decrease in image quality, and an increase in the number of process steps.

CITATION LIST

Patent Literature

Patent Literature 1: JP 2010-055029 A
Patent Literature 2: JP 2008-295034 A

SUMMARY OF THE INVENTION

Accordingly, standardization of color adjustment in the post production which is a post process of video production has been aimed for by the film academy (The Academy of Motion Picture Arts and Sciences, which is abbreviated as AMPAS). FIG. 10 shows an example of a color conversion architecture of the digital motion picture production workflow standard AMPAS-IIF advocated by the AMPAS.

In the color conversion architecture of AMPAS-IIF shown in FIG. 10, digital video data conversion is basically defined by two common color spaces of an input color space ACES (Academy Color Encoding Specification) 100 and an output color space OCES (Output Color Encoding Specification) 102, a common conversion RRT (Reference Rendering Transform) 104 correlating the two common color spaces with each other, and an input device conversion IDT (Input Device Transform) 106/an output device conversion ODT (Output Device Transform) 108 carrying out conversion between an input/output device and the corresponding common space.

The IDT 106 serves to transform video data captured by a digital camera 110 (color space of the digital camera) into the ACES 100 which is the common color space for input. The ODT 108 serves to transform the video data from the OCES 102 which is the common color space for output into output video data of a digital projector 112 (color space of the digital projector).

That is, in the digital video data transform system, the video data captured by the digital camera 110 is transformed into the ACES 100 by the IDT 106, video data of a computer graphics (CG) 114 is directly transformed into the ACES 100, the resultant is subjected to editing and processing such as color adjustment in the ACES 100, the resultant is transformed into the OCES 102 by the RRT 104, and the resultant is transformed from the OCES 102 into the output video data of the digital projector 112 by the RDT/ODT 108.

In addition, a standard negative film density APD (AMPAS Printing Density) 116 and an ADX 118 obtained by encoding the standard negative film density are defined, a UB transform/inverse transform 120 including a fixed transform (universal build) and its inverse transform (universal unbuild) with respect to the input color space ACES 100 is set, and a digital image data transform system and a conventional silver halide film system are made to correspond to each other.

In the silver halide film system, image density data read from a film, which has been obtained by capturing an image using a film camera, by the use of a film scanner 122 is converted into density data of the standard negative film density APD 116, the resultant is further converted into the ADX code 118, the resultant is converted into the ACES 100 by the UB transform 120, the resultant is subjected to editing and processing such as color adjustment in the ACES 100, the resultant is converted again into the ADX code 118 from the ACES 100 by the inverse transform 120, an intermediate negative film 126 is prepared by a film recorder 124, a positive film for motion picture is prepared by an optical printing 128, and the positive film is provided to a film projector 130.

Here, the ACES 100 is defined as a scene-referred color space and has values obtained by linearly transforming tristimulus values XYZ of CIE obtained by measuring a scene itself with a colorimeter, in which chromaticities of three primary colors of RGB covering all spectrum loci are determined as shown in FIG. 11 and are encoded in 16 bits (bit float). That is, the color gamut and the dynamic range of image data which can be described in the ACES 100 can be said to be infinite. Reference white of the ACES 100 is defined as D60.

The ACES 100 which is such a vast color space is also a common color space in which images captured with the film camera and the digital camera and CG images are stored as original image masters. Color adjustment is carried out in the ACES space.

On the other hand, the OCES 102 is an output color space in which an ideal display device having a dynamic range of 1,000,000:1 or more is assumed and corresponds to the ACES color space 100 through the RRT conversion 104 in a one-to-one manner. The OCES 102 is positioned as an internal color space of the AMPAS-IIF and it is not assumed therein that a general user directly handles the OCES image data.

In this way, the AMPAS-IIF gives a standard to a post production process of video production and provides an architecture for converting various video sources into a standard working color space for color adjustment (scene-referred color space (ACES)), an architecture for transforming a video for viewing in movie screening or TV broadcasting from the ACES to a color space of an ideal output device (OCES), and an architecture for converting colors from the OCES to those of an actual display device, whereby it is possible to streamline troublesome image conversion and color adjustment operations in the editing process after shooting.

In this way, by complying with the standard workflow in the post production, it is possible to perform operations in a standard data format and a standard color space and to reduce supplemental work in image conversion, thereby streamlining the color adjustment operation, improving image quality, and reducing the number of processes.

However, digital cameras of various manufacturers and types are used in capturing a video, monitors of various manufacturers and types are used to check the captured video, and thus color spaces of signals to be displayed on the monitor for checking are diverse. Accordingly, colors cannot be strictly evaluated at the time of checking a video at the shooting location and thus color adjustment on a video is carried out in post production which is a post process of video production. The color conversion architecture of the AMPAS-IIF is used for the color adjustment of a video in the post production so as to streamline the color adjustment operation, to improve image quality, and to reduce the number of processes, but since a director of photography at the shooting location has a right to make a decision of captured colors in the video production, the director of photography directing the shooting at the location goes to a location of post production after the shooting and performs the color adjustment work necessary for various scenes, cuts, or frames so as to reproduce colors suitable for shooting intention for each scene while watching the captured video along with a colorist who is a specialist of color adjustment in the post production.

Since this color adjustment work is generally a process which is finished after trial and error, all the videos should be watched. In addition, since cuts or frames to be color-adjusted should be repeatedly watched several times, there is a problem in that it takes a very long time for the work. Further, since a director of photography or a colorist requiring high personnel expenses performs the work, there is a problem in that the cost of video production increases.

Meanwhile, Patent Literature 1 discloses a technique of tuning a video signal captured with a video camera to color characteristics of a cinema film, but does not aim at conversion for fitting characteristics of video signals captured with video cameras having different characteristics or color conversion faithful to captured scenes. In addition, also in the technique disclosed in Patent Literature 2, the conversion for fitting the characteristics of images captured with cameras having different characteristics is not carried out and thus images having colors faithful to the captured scenes are not displayed on a display.

Therefore, even if these techniques are used, it is not possible to streamline color adjustment work in the post production of motion picture production by performing the color adjustment work at the shooting location in advance.

The present invention has been conducted in order to dissolve the above-mentioned problems in the conventional technology, and an object thereof is to provide a video conversion device which can allow a director of photography to perform color adjustment at the shooting location in the course of video production, that is, in the course of motion picture production or TV program production and which can carry out color conversion faithful to captured scenes on respective video data captured with plural cameras and matching of colors between the plural cameras with high accuracy when performing the color adjustment on the video data captured with the plural cameras while checking videos with plural monitors, thereby which can further streamline video production processes, reduce costs and improve quality of a video, and also to provide a photography system for a motion picture system employing the video conversion device, a video conversion method, and a recording medium of a video conversion program.

In order to attain the above-described object, a video conversion device according to a first aspect of the present invention is used in a photography system for capturing a video with a camera in a motion picture system in which a projection image is prepared from a camera video data signal captured with the camera, comprising: a camera video signal acquiring unit that acquires the camera video data signal; a first color conversion unit that converts the camera video data signal into a scene-referred color space captured with the camera to acquire video data of a first image in the scene-referred color space; a color adjustment unit that performs color adjustment on the video data of the first image to obtain the video data of the first image as color-adjusted; a second color conversion unit that converts the video data of the first image as color-adjusted into a standard color space for video output to acquire video data of a second image in the standard color space for output; and a third color-space conversion unit that converts the video data of the second image into a color space of a display device for checking to acquire video data of a third image in the color space of the display device for checking so as to check colors obtained in a final output device when the video data of the second image is converted into a color space of the final output device, from which a video is finally output, with a different display device in advance.

Preferably, the final output device is a projector adapted to screen the projection image in the motion picture system in which the projection image is prepared from plural types of the camera video data signals captured with a plurality of the cameras, the video conversion device is connected to the plurality of the cameras or connected to the plurality of the cameras in a one-to-one correspondence manner and is connected to a plurality of the display devices for checking or connected to the plurality of the display devices for checking in a one-to-one correspondence manner, and the display devices for checking are used to check colors in the final output device on a shooting side of the motion picture system.

In addition, preferably, an editing information file having details of editing and processing including the color adjustment by the color adjustment unit described therein is transmitted to a video production system, which is a system of post production in the motion picture system, along with a time code of the video data of the third image with a low resolution.

Preferably, the standard color space for output is a color space not depending on an output device.

Preferably, the standard color space for output is an output color space in which an ideal output device having a dynamic range of 10000:1 or more is assumed, an output color space in which a standard output device is assumed, or an output color space in which a preview of a projection film to be screened with a projector in a motion picture system is assumed.

The standard color space for output may be a color space obtained by narrowing the dynamic range of an ideal output device without lowering display quality after performing the color space transform for a display device for checking, or may be a color space obtained by narrowing the dynamic range at a ratio of 10000:1 or more.

Preferably, the camera is a digital video camera or a digital camera with which a video of a subject is shot to acquire the camera video data signal.

It is preferable that the video conversion device further comprises a controller connected to the video conversion device that controls the color adjustment in the color adjustment unit, wherein the controller includes a display unit, a controller color conversion unit, a video analysis unit, a control unit, and an input unit, wherein the controller color conversion unit is configured to perform color conversion for reproducing, on the display unit, the video data of the second image in the standard color space for output acquired by the second color conversion unit as an edited and processed video having the colors in the final output device, wherein the video analysis unit is configured to analyze the edited and processed video having the colors in the final output device that has been color-adjusted by the color adjustment unit and reproduced on the display unit, wherein the input unit is used to input a color adjustment parameter for the color adjustment by the color adjustment unit and to change display on the display unit, wherein the control unit is configured to control the color adjustment in the color adjustment unit depending on the color adjustment parameter input through the input unit, and wherein the display unit is provided with a display screen on which the edited and processed video having the colors in the final output device that is to be reproduced on the display unit and/or a result of video analysis by the video analysis unit is displayed, and an input screen to which the color adjustment parameter is input through the input unit.

Preferably, the display unit displays an analysis result of a part of the edited and processed video as color-adjusted by the color adjustment unit and displayed on the display screen, which part is selected through the input unit, on the display screen.

Preferably, the display screen of the display unit has an area for displaying the video and an area for displaying the analysis result of the part selected through the input unit and/or the result of the video analysis in the video analysis unit.

Preferably, the display unit displays a warning on the display screen when pixels of the video depart from the color space of the final output device or when the analysis result of the part selected through the input unit departs from the color space of the final output device.

Preferably, the controller further includes an alert unit that issues an audible warning when pixels of the video depart from the color space of the final output device or when the analysis result of the part selected through the input unit departs from the color space of the final output device.

Preferably, the controller is connected to the color adjustment unit via a line and causes the color adjustment unit to perform the color adjustment depending on the color adjustment parameter based on control of the control unit.

It is preferable that the video conversion device further comprises an output unit that outputs a color adjustment value and/or a color adjustment reference table from the color adjustment unit and/or a low-resolution and/or compressed image of an edited and processed video having the colors in the final output device or the standard color space for output, which video has been color-adjusted by the color adjustment unit.

Preferably, a color adjustment value and/or a color adjustment reference table from the color adjustment unit and/or an image of an edited and processed video as color-adjusted by the color adjustment unit is output as associated with a date and/or a time code upon shooting.

In addition, in order to attain the above-described object, a photography system for a motion picture system according to a second aspect of the present invention comprises: a plurality of cameras; a plurality of the video conversion devices according to any one of claims 1 to 14 that are so disposed as to correspond to the plurality of cameras, respectively; display devices for checking that are so disposed as to correspond to the plurality of the video conversion devices, respectively; a captured video storage device that stores the camera video data signals captured with the plurality of cameras; and an edited and processed video storage device that stores a low-resolution image of an edited and processed video having the colors in the final output device that has been color-adjusted by the color adjustment unit.

Preferably, the video conversion devices each transmit an editing information file having details of editing and processing including the color adjustment by the color adjustment unit described therein to a video production system, which is a system of post production in the motion picture system, along with a time code of the video data of the third image with a low resolution.

Moreover, in order to attain the above-described object, a video conversion method according to a third aspect of the present invention is performed in a photography system for capturing a video with a camera in a motion picture system in which a projection image is prepared from a camera video data signal captured with the camera, comprising the steps of: acquiring the camera video data signal; converting the camera video data signal into a scene-referred color space captured with the camera to acquire video data of a first image in the scene-referred color space; performing color adjustment on the video data of the first image to obtain the video data of the first image as color-adjusted; converting the video data of the first image as color-adjusted into a standard color space for video output to acquire video data of a second image in the standard color space for output; and converting the video data of the second image into a color space of a display device for checking to acquire video data of a third image in the color space of the display device for checking so as to check colors obtained in a final output device when the video data of the second image is converted into a color space of the final output device, from which a video is finally output, with a different display device in advance.

In order to attain the above-described object, a fourth aspect of the present invention provides a computer-readable recording medium having recorded thereon a video conversion program causing a computer to perform respective procedures of the video conversion method according to the third aspect.

According to the aspects of the present invention, by allowing a director of photography to perform color adjustment at the shooting location of a motion picture system with the above-mentioned configuration, it is possible to match colors between plural cameras with high accuracy when performing the color adjustment on the video data captured with the plural cameras while checking videos with plural monitors, thereby further streamlining video production processes, reducing costs, and improving quality of a video.

In addition, according to the aspects of the present invention, by allowing a director of photography to perform a part of a color adjustment process in a motion picture system, the director of photography can directly perform the color adjustment based on shooting intention while a time lag is small. Accordingly, it is possible to reduce the number of times of trial and error in the post production and thus to reduce costs.

Further, according to the aspects of the present invention, since color evaluation and color adjustment are allowed at the shooting location, it is possible to reduce shooting errors associated with colors and to immediately capture and adjust a video based on the intention of a director of photography, thereby improving quality of a video.

The present invention provides an architecture which makes the AMPAS-IIF, of which application to only post production is assumed, applicable to a shooting location and thus can further streamline the video production processes and improve the quality of a video.

BRIEF DESCRIPTION OF THE DRAWINGS

FIG. 8 is a schematic diagram illustrating an example of the display screen of the display unit of the controller shown in FIG. 3.

DETAILED DESCRIPTION OF THE INVENTION

Hereinafter, a video conversion device, a photography system in a motion picture system employing the video conversion device, a video conversion method, and a video conversion program will be described in detail with reference to exemplary embodiments shown in the accompanying drawings.

Figure 1:
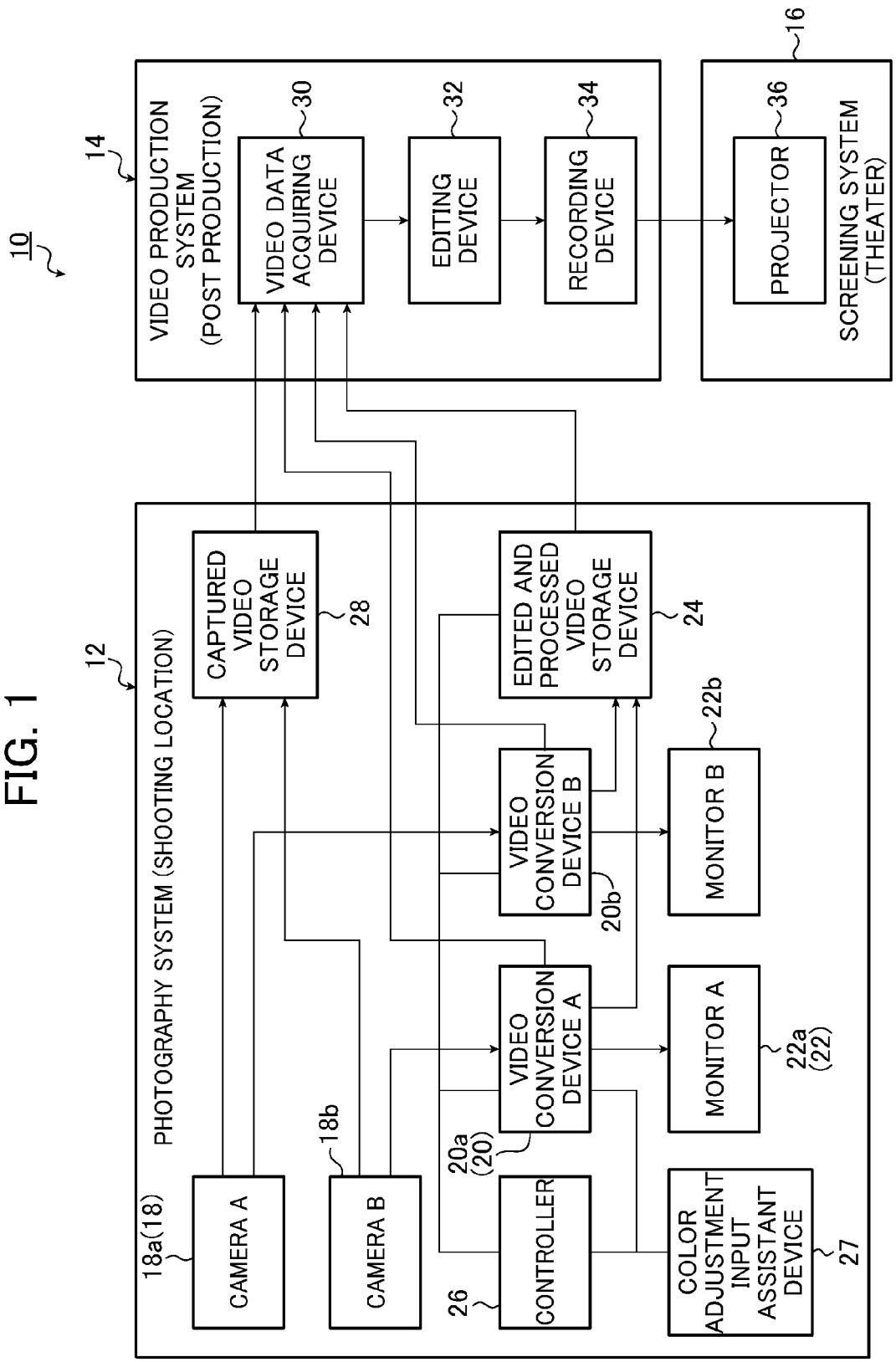
FIG. 1 is a block diagram schematically illustrating an example of a configuration of a motion picture system using a video conversion device according to an embodiment of the present invention.

FIG. 1 is a block diagram schematically illustrating an example of a configuration of a motion picture system using a video conversion device according to an embodiment of the present invention.

Examples

As shown in FIG. 1, a motion picture system 10 includes a photography system (shooting location) 12 that captures a video with a camera to acquire a camera video data signal and that performs color adjustment thereon, a video production system (post production) 14 that prepares video source data by editing and processing of the camera video data from the photography system 12 and that produces digital video data for output to a digital projector or a positive film for screening with a film projector, and a screening system (theater) 16 that screens motion picture videos by the use of the digital projector or the film projector.

The photography system 12 at the shooting location includes two cameras A18a and B18b, two video conversion devices A20a and B20b according to the present invention that are connected to the cameras A18a and B18b (generically referenced by reference numeral 18), respectively, monitors A22a and B22b that are connected to the video conversion devices A20a and B20b, respectively, an edited and processed video storage device 24 that stores an edited and processed video data for output with a low resolution which is obtained by editing and processing such as color adjustment in the video conversion devices A20a and B20b and details of the editing and processing, a controller 26 that controls the video conversion devices A20a and B20b and the edited and processed video storage device 24, a color adjustment input assistant device 27 that assists a color adjustment operation of the controller 26, and a captured video storage device 28 that stores camera video data acquired by capturing a video with the cameras 18.

The cameras 18 serve to shoot a video of a subject to acquire a camera video data signal. The cameras are not particularly limited as long as they can acquire the camera video data signal, and a digital video camera or a digital camera which can acquire digital video data can be preferably used. The photography system 12 shown in the drawing includes two cameras A18a and B18b, but may include three or more cameras.

The cameras used in the present invention may be of different manufacturers or different types. In this case, the present invention can exhibit the advantageous effects better.

The video conversion devices A20a and B20b are video conversion devices according to an embodiment of the present invention and are disposed corresponding to the cameras A18a and B18b in a one-to-one (1:1) correspondence manner. The video conversion devices A20a and B20b can allow a director of photography or a colorist to perform color adjustment immediately after shooting in the photography system 12 at the shooting location and to check colors, which are acquired when the video data are converted into a color space of a digital projector or a color space of a positive film for screening used in a film projector and are reproduced by a projector such as the digital projector or the film projector of the screening system 16, that is, the colors of the video to be screened, by the use of the respective monitors A22a and B22b which are display devices other than the projector in advance.

Hereinafter, the final output device of the motion picture system 10 will be described using a digital projector as a representative example.

As described above, when three or more cameras are disposed, it is preferable that three or more video conversion devices respectively corresponding thereto be disposed.

The video conversion devices A20a and B20b (generically referenced by reference numeral 20) transmit an editing information file EDL (Edit Decision List), in which details (such as color adjustment parameters, gray-scale adjustment parameters, and other image processing parameters) of editing and processing such as color adjustment performed by the director of photography or the like such as a CDL (Color Decision List) or a 3DLUT (3-Dimensional Look-Up Table) for color adjustment are described, along with a time code of the camera video data to the video production system 14 for post production. Here, the CDL is a description of details of the editing and processing (including modification of colors and gray scales and other overall image processing), which are performed on camera video data as raw data, and the 3DLUT is used to carry out the details of the editing and processing. The EDL such as the CDL or the 3DLUT including the time code is transmitted to the video production system (post production) 14 and is used to edit and process camera video data for preparing video source data in the video production system 14.

In this way, a state of color adjustment at the shooting location can be transmitted from the photography system 12 to the post production 14.

Here, since the camera video data used in the video conversion device 20 is used to check a video or to adjust colors thereof, the camera video data does not need to be camera video data of a full size captured with the cameras 18 and may be camera video data of a small size or camera video data with a low resolution. When the real-time property of the color adjustment is regarded as important, it is preferable that the camera video data be camera video data of a small size with a low resolution.

The detailed configuration of the video conversion device 20 will be described later.

The monitors A22a and B22b (generically referenced by reference numeral 22) are disposed corresponding to the video conversion devices A20a and B20b in a one-to-one (1:1) correspondence manner, are display devices for displaying results of the color adjustment in the video conversion devices A20a and B20b, and are monitors for checking colors of a video, colors of which are adjusted immediately after shooting by a director of photography or the like and which is screened with a projector, immediately at the shooting location.

As described above, when three or more video conversion devices are disposed, it is preferable that three or more monitors be disposed respectively corresponding thereto.

The monitors used in the present invention are not particularly limited as long as they can reproduce and display the colors of a video screened with a projector of the screening system 16, and known display devices can be used. The monitors used in the present invention may be of different manufacturers or different types. In that case, the present invention can exhibit the advantageous effects better.

In this embodiment, as described above, it is preferable that plural cameras 18 be used, plural video conversion devices 20 respectively corresponding to the plural cameras 18 be disposed, and plural monitors 22 respectively corresponding to the plural video conversion devices 20 be disposed, that is, it is preferable that the cameras 18, the video conversion devices 20, and the monitors 22 correspond to each other in a 1:1:1 correspondence manner, but the present invention is not limited to this configuration and plural cameras 18 may be disposed for one video conversion device 20 or plural monitors 22 may be disposed for one video conversion device 20 even when a single video conversion device 20 is used or even when plural video conversion devices 20 are used.

The edited and processed video storage device 24 serves to store an edited and processed video data for output with a low resolution which is obtained by editing and processing such as color adjustment in the video conversion device 20 and includes a hard disk, a memory, or the like. Here, the edited and processed video data for output with a low resolution is video data obtained by performing editing and processing (including modification of colors or gray scales and other overall image processing) on camera video data as raw data. It is preferable that the edited and processed video data with a low resolution be video data obtained by editing and processing camera video data with a low resolution.

The edited and processed video data with a low resolution stored in the edited and processed video storage device 24 is transmitted to the video production system (post production) 14 and is used to edit and process the camera video data for preparing video source data in the video production system 14.

In this embodiment, the camera video data with a low resolution or the edited and processed video data with a low resolution or the low-resolution image of an edited and processed video is not limited to video data or images originally having a low resolution, but may be obtained by compressing video data, a video, or an image with a high resolution or a normal resolution or may be lowered in resolution by compression.

The controller 26 serves to control the video conversion devices 20 and the edited and processed video storage device 24 and constitutes the video conversion device according to the present invention along with the video conversion devices 20.

When a director of photography or the like performs color adjustment while checking the reproduced colors of the captured video displayed on the monitors 22 after the shooting, the controller 26 serves to receive color adjustment parameters to be input for the color adjustment and to display the color-adjusted video and/or the analysis result thereof, particularly, the color analysis result of the video on the display unit thereof. The controller 26 also serves to display a warning or to issue an alert when pixels of the color-adjusted video or the analysis result of at least a selected part of the color-adjusted video departs from the color space of the digital projector which is a final output device, or the like.

The controller 26 is not particularly limited as long as it can communicate with the video conversion devices 20 and the edited and processed video storage device 24 in a wired or wireless manner and can control the video conversion devices 20 and the edited and processed video storage device 24. For example, a personal computer (PC) connected thereto via a communication network such as Ethernet (registered trademark), for example, a notebook PC, a desktop PC, and a tablet PC such as an iPad (product name) can be used.

The detailed configuration of the controller 26 will be described later.

Figure 9:
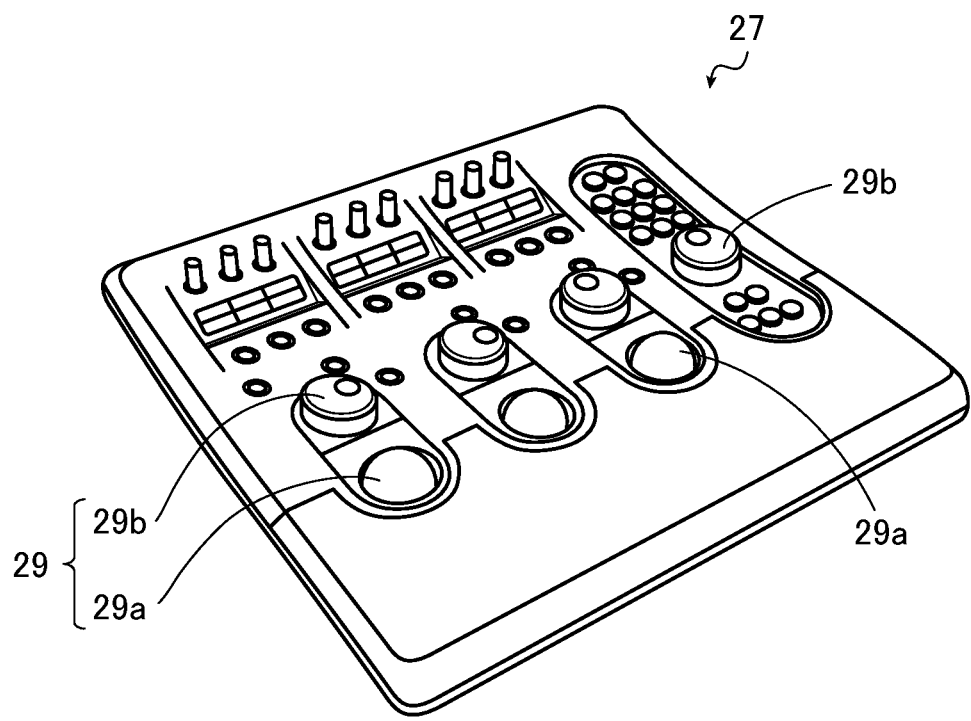
FIG. 9 is an appearance diagram illustrating an example of a color adjustment input assistant device of the photography system in the motion picture system shown in FIG. 1.

As shown in FIG. 9, the color adjustment input assistant device 27 serves to access the controller 26 or the video conversion devices 20 so as to improve the operability of the color adjustment operation performed by the controller 26. The color adjustment input assistant device 27 of which the appearance is shown in FIG. 9 includes a user interface 29 such as a track ball 29a and a dial 29b and implements color adjustment by linking the color adjustment parameters of the controller 26 with the operation of the user interface 29 such as the track ball 29a or the dial 29b.

The captured video storage device 28 serves to store the camera video data itself acquired by capturing a video with the cameras 18, that is, to store the camera video data as raw data without editing and processing the camera video data. The captured video storage device 28 includes a hard disk or a memory.

The camera video data stored in the captured video storage device 28 is transmitted to the video production system (post production) 14 and is provided to editing and processing for preparing video source data in the video production system 14.

In the photography system 12 having the above-mentioned configuration, a director of photography or the like can perform editing and processing such as tone adjustment on the camera video data acquired by capturing a video with the cameras 18 by the use of the video conversion devices 20 and the controller 26 at the shooting location after the shooting and as a result of the editing and processing, can display on the monitors 22 a video or colors which are reproduced by the digital projector as the final output device of the motion picture system 10. Accordingly, even when the director of photography or the like displays the camera video data acquired by capturing a video with the plural cameras 18 of different manufacturers or types on the plural monitors 22 of different manufacturers or types and performs the editing and processing such as tone adjustment while checking the video, it is possible to match colors between the plural cameras 18 and between the plural monitors 22 with high accuracy.

The video production system 14 which is for the post production includes a video data acquiring device 30 that acquires camera video data, details of the editing and processing such as color adjustment performed at the shooting location, edited and processed data for output with a low resolution, and the like from the photography system 12, an editing device 32 that performs editing and processing such as color adjustment on the camera video data on the basis of the details of the editing and processing such as tone adjustment and the edited and processed data for output with a low resolution which are acquired by the video data acquiring device 30 and that generates edited and processed video source data, and a recording device 34 that generates digital video data for output to a digital projector from the video source data generated by the editing device 32 and records the generated digital video data on a hard disk or the like or finally produces a positive film for screening with a film projector.

The video data acquiring device 30 serves to acquire the camera video data from the captured video storage device 28 of the photography system 12, to acquire the editing information file (EDL), in which details of the editing and processing such as the CDL or the 3DLUT including a time code are described, from the video conversion devices A20a and B20b of the photography system 12, and to acquire the edited and processed video data for output with a low resolution from the edited and processed video storage device 24 of the photography system 12.

The editing device 32 performs editing and processing such as tone adjustment on the camera video data acquired by the video data acquiring device 30 on the basis of the editing information file (EDL), in which details of the editing and processing such as color adjustment, the CDL or the 3D LUT including a time code for instance, are described, and the edited and processed data for output with a low resolution which are acquired by the video data acquiring device 30, and generates edited and processed video source data. The editing and processing performed by the editing device 32 include all the editing and processing necessary for motion picture production, such as synthesis, editing and cutting according to the CDL or the EDL, color adjustment (tone adjustment) and gray scale adjustment using the 3DLUT, and the like.

In the photography system 12 using the video conversion devices 20 according to the present invention, even camera video data captured with plural cameras 18 is subjected to editing and processing by a director of photography or the like while checking a video at the shooting location in advance, and details of the editing and processing (the EDL such as the CDL and the 3DLUT) and the edited and processed video data with a low resolution are provided to the editing device 32 of the post production 14 shown in the drawing. Accordingly, it is not necessary for a director of photography, a colorist, or the like to perform the tone adjustment with trial and error while watching all the videos in the post production 14 and thus it is possible to further streamline the video production processes of the post production 14 and to achieve a decrease in cost and an improvement in quality of a video.

The recording device 34 serves to generate digital video data for output to a digital projector from the video source data generated by the editing device 32 and to record the generated digital video data on a hard disk or the like.

Figure 10:
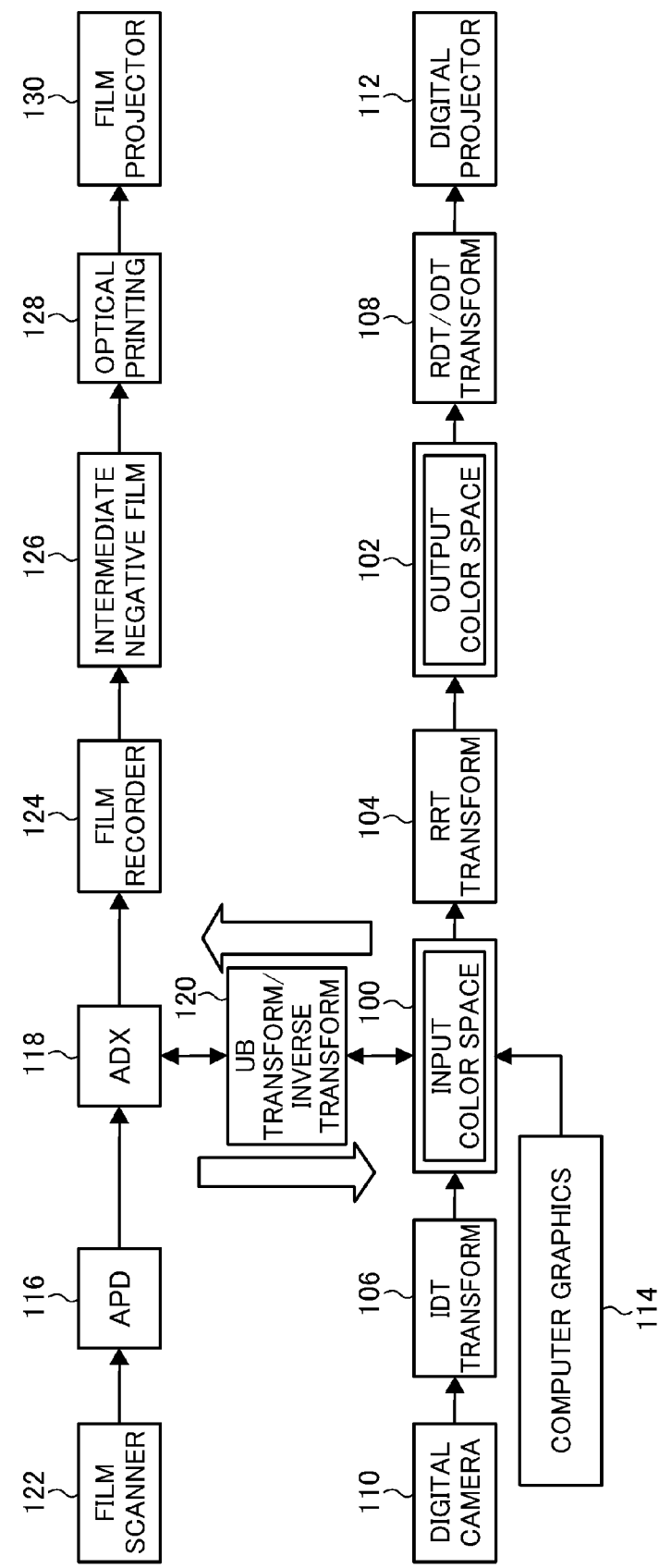
FIG. 10 is a block diagram illustrating an example of a color conversion architecture of a digital motion picture production workflow standard which is carried out in post production of the motion picture system.
Figure 11:
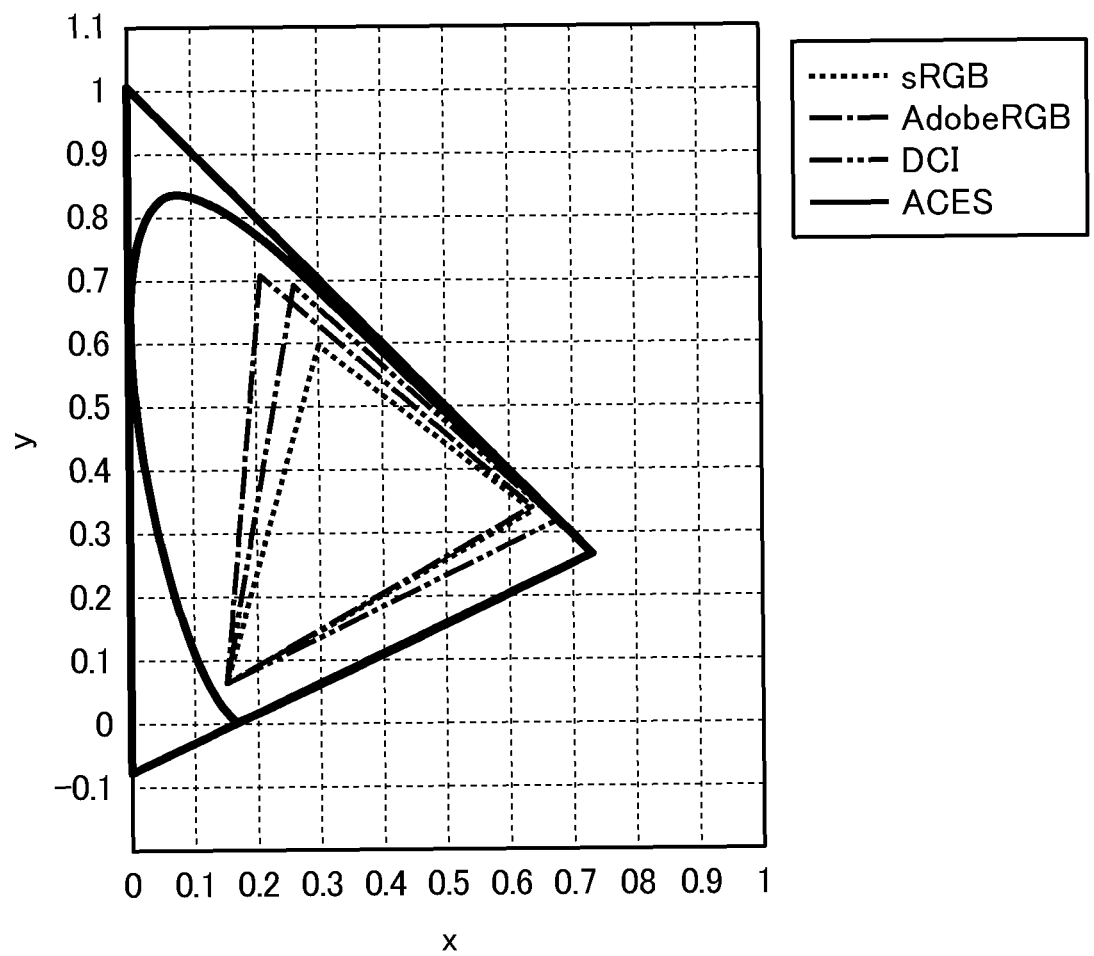
FIG. 11 is a chromaticity diagram illustrating various color spaces including an input color space of the color conversion architecture shown in FIG. 10.

The recording device 34 may prepare an intermediate negative film by the use of a film recorder, as shown in FIG. 10, from the video source data generated by the editing device 32, prepare a positive film for motion picture by means of optical printing, and finally produce a positive film for screening with the film projector.

The screening system 16 in a theater includes a projector 36 that screens a motion picture as a digital video on the basis of the digital video data for output prepared by the video production system 14 or screens a motion picture using the positive film for screening produced by the video production system 14.

As the projector 36, a digital projector that projects a digital video on the basis of the digital video data for output distributed from the video production system 14 or a film projector that projects a video of the positive film for screening produced by the video production system 14 may be used.

Next, the video conversion device according to an embodiment of the present invention will be described below with reference to FIG. 2.

Figure 2:
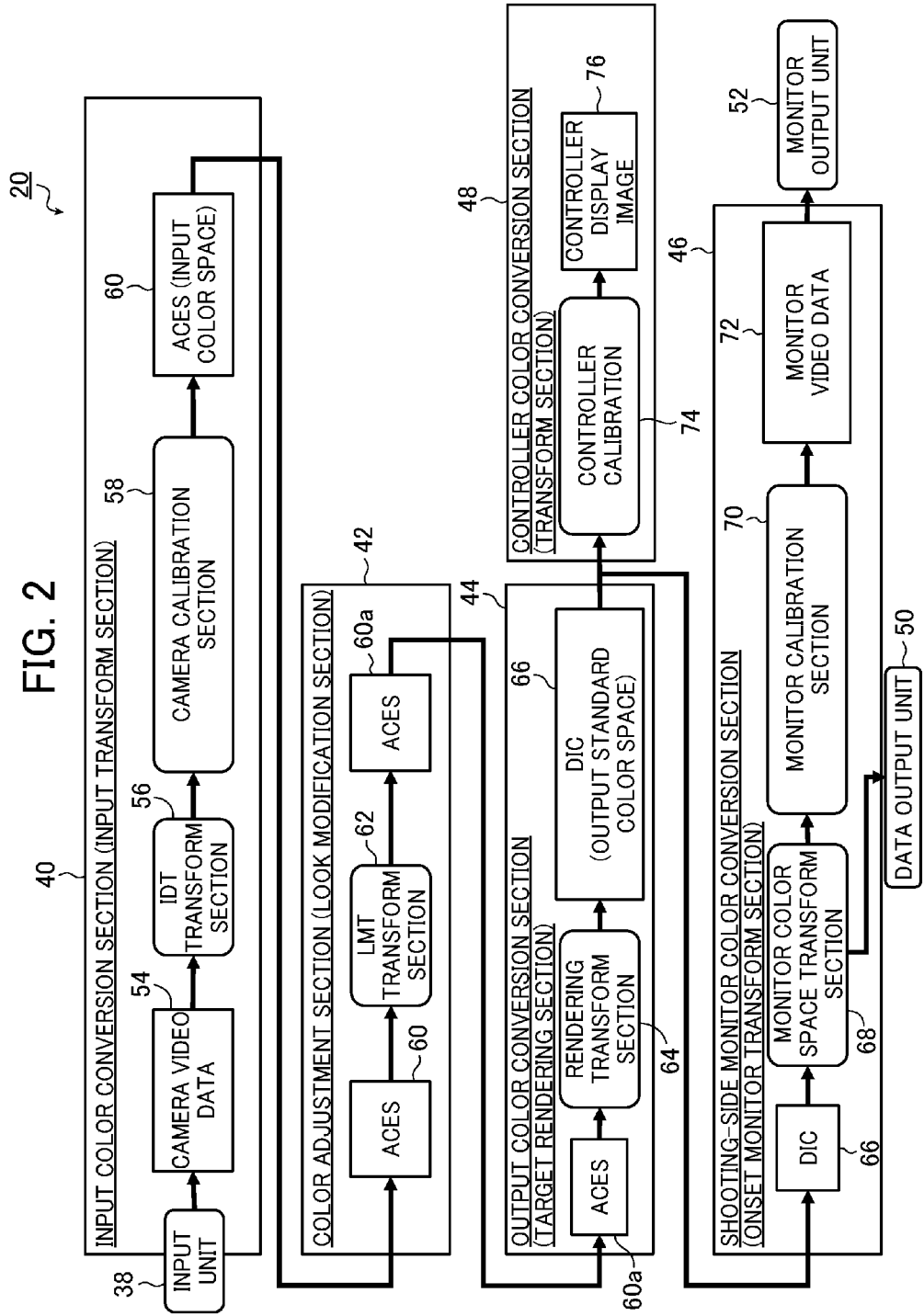
FIG. 2 is a schematic conceptual diagram illustrating an example of a configuration and a process flow of the video conversion device shown in FIG. 1.

FIG. 2 is a schematic conceptual diagram illustrating an example of a configuration and a process flow of the video conversion device shown in FIG. 1.

The video conversion device 20 shown in the drawing is a video conversion device in which the color conversion architecture of the AMPAS-IIF shown in FIG. 10 which is basically used in the post production 14 of the motion picture system 10 is made applicable to the photography system 12. The video conversion device 20 includes an input unit 38, an input color conversion section (input transform section) 40, a color adjustment section (look modification section) 42, an output color conversion section (target rendering section) 44, a shooting-side monitor color conversion section (onset monitor transform section) 46, a controller color conversion section (controller transform section) 48, a data output unit 50, and a monitor output unit 52.

The input unit 38 is a section to which camera video data captured with the cameras 18 is input and which makes camera video data 54 received in the input color conversion section 40.

The input color conversion section 40 serves to convert the camera video data 54 into an input color space ACES 60 (video data therein), similarly to the color conversion architecture of the AMPAS-IIF shown in FIG. 10, and includes an IDT transform section 56 for input device transform and a camera calibration section 58.

Similarly to the IDT 106 shown in FIG. 10, the IDT transform section 56 is configured to transform the camera video data 54 captured with the cameras 18 (the color space of the cameras 18) to the ACES 60 (video data thereof) as a common input color space.

The camera calibration section 58 is configured to correct the video data transformed to the input color space ACES 60 (video data thereof) by the IDT transform section 56 depending on the individual differences of the cameras.

Accordingly, the camera video data captured with plural cameras 18 of different manufacturers or types is transformed to the input color space ACES 60 (video data thereof) defined as a scene-referred color space, so that the camera video data is transformed to video data with the same colors for one and the same scene.

In this way, even the camera video data captured with plural cameras 18 of different manufacturers or types can be transformed to video data of the input color space ACES 60 matched with each other with high accuracy.

The color adjustment section 42 is a section which most characterizes the present invention, is called a look modification section, and is a section which allows color adjustment at the shooting location and adjustment of colors of a video, for example, colors of a scene, on the basis of the color adjustment parameters from the above-described controller 26 in the input color space ACES 60. That is, the color adjustment section 42 enables a director of photography or the like to adjust colors of a video while checking the video at the shooting location. The color adjustment section 42 includes an LMT (Look Modification Transform) transform section 62 that performs color adjustment based on the color adjustment parameters from the controller 26 in the input color space ACES 60.

Here, the LMT transform section 62 serves to perform color adjustment based on an instruction from a user such as a location director for direction suitable for video contents or the atmosphere of stories or scenes. Since the LMT transform section 62 transforms video data to color-adjusted video data in the input color space ACES 60, the color space of the color-adjusted video data is also ACES and is expressed herein as an input color space ACES 60*a*.

Details of the color adjustment performed by the color adjustment section 42 will be described later.

The output color conversion section 44 is called a target rendering section, performs rendering (editing and processing) on an ACES video based on the output target of video contents as designated in advance (depending on whether the video is adapted for a theater or for a TV broadcast, for digital screening or for film projection, what type of film is used, and so forth), and transforms the ACES video subjected to the rendering to an output standard color space of a target output device that does not depend on the output device. That is, the output color conversion section 44 serves to color-convert the input color space ACES 60*a* (60) into the output standard color space (DIC: Device Independent Color) 66 not depending on the output device and includes a rendering transform section 64 for rendering to output colors that edits and processes the video data with the input color space ACES 60*a* (60) into output colors to acquire the edited and processed video data in the output standard color space DIC 66.

Here, the output standard color space DIC 66 is not particularly limited as long as it is a standard color space not depending on the output device, and thus the OCES 102 which is a common output color space of the color conversion architecture of the AMPAS-IIF shown in FIG. 10 may be used. Therefore, in this case, the rendering transform section 64 may be the RRT transform section 104 shown in FIG. 10.

In addition, for example, the rendering transform section 64 may be constructed by an RDT transform section, a transform section for film preview of a film for motion picture, or the like.

Therefore, the output standard color space (DIC) may be a color space obtained by narrowing the dynamic range of an ideal output device without lowering display quality after performing the color space transform for a display device for checking, or may be a color space obtained by narrowing the dynamic range at a ratio of 10000:1 or more.

The output standard color space (DIC) may be an output color space in which a standard output device is assumed or an output color space in which a preview of a projection film screened with the projector in the motion picture system is assumed.

The shooting-side monitor color conversion section 46 is called onset monitor transform section, and serves to perform color space transform, gamma conversion, and calibration for each of the monitors 22 on preview monitor display MCV (Monitor Code Value) at the shooting location and to transmit a video as video data signals to the preview monitors 22 connected thereto. That is, the shooting-side monitor color conversion section 46 serves to convert the video data from the output standard color space (DIC) 66 not depending on the output device into a color space depending on the monitors 22 as actual output devices (DDC: Device Dependent Color) and to convert the video data in the output standard color space (DIC) 66 into monitor video data 72 for displaying colors reproduced by the digital projector as the final output device of the motion picture system 10 on the monitors 22. The shooting-side monitor color conversion section 46 includes a monitor color space transform section 68 that transforms a color space and a γ value and a monitor calibration section 70 that performs conversion based on the individual differences of the monitors 22.

For display on the monitors 22, the monitor color space transform section 68 serves to transform the video data in the output standard color space (DIC) 66 into the color space of the monitors 22 and to transform the video data so as to suit to the γ characteristics of the monitors 22.

The monitor calibration section 70 serves to correct the video data transformed into the color space of the monitors 22 by the monitor color space transform section 68 depending on the individual differences of the monitors 22.

Accordingly, even a video to be displayed on the plural monitors 22 of different manufacturers or types can be displayed in the same colors as the colors reproduced by the digital projector which is the final output device of the motion picture system 10.

As a result, even a video to be displayed on the plural monitors 22 of different manufacturers or types can be displayed as a video matched with high accuracy.

The controller color conversion section 48 is called controller transform section and may perform calibration according to a CCV (Controller Code Value) of the display unit (display 84: see FIG. 3) of the controller 26 and output the resultant video for checking a thumbnail video in the controller 26. That is, the controller color conversion section 48 serves to convert thumbnail video data in the output standard color space (DIC) 66 of the output color conversion section 44 into controller video data for displaying colors reproduced by the digital projector which is the final output device of the motion picture system 10 on the display unit (84) of the controller 26 and to display the controller video data as thumbnail images 76 (reference signs 86d, 88g, and 90d in FIGS. 4, 5, and 6) to be displayed by the controller. The controller color conversion section 48 includes a controller calibration section 74 that performs a conversion depending on the individual difference of the controller 26.

The controller calibration section 74 converts the video data in the output standard color space (DIC) 66 of the output color conversion section 44 into video data in the color space of the display unit (84) of the controller 26 and corrects the video data depending on the individual difference of the controller 26.

Accordingly, it is possible to display the same colors as the colors reproduced by the digital projector which is the final output device of the motion picture system 10 on the display unit (84) of the controller 26.

The data output unit 50 serves to output signals subjected to only standard color space transform and gamma conversion (for example, rec 709 or sRGB) from the monitor color space transform section 68 of the shooting-side monitor color conversion section 46 to the post production 14 as data for video preview (Dailies) which is performed every day after the shooting. The data output unit 50 may not be provided.

The monitor output unit 52 serves to output the monitor video data signal from the shooting-side monitor color conversion section 46 to the preview monitor 22.

The video conversion device according to the present invention basically has the above-mentioned configuration.

The controller 26 constitutes the video conversion device of the present invention along with the video conversion device 20 as described above, and serves to control the video conversion device 20 and the edited and processed video storage device 24.

Figure 3:
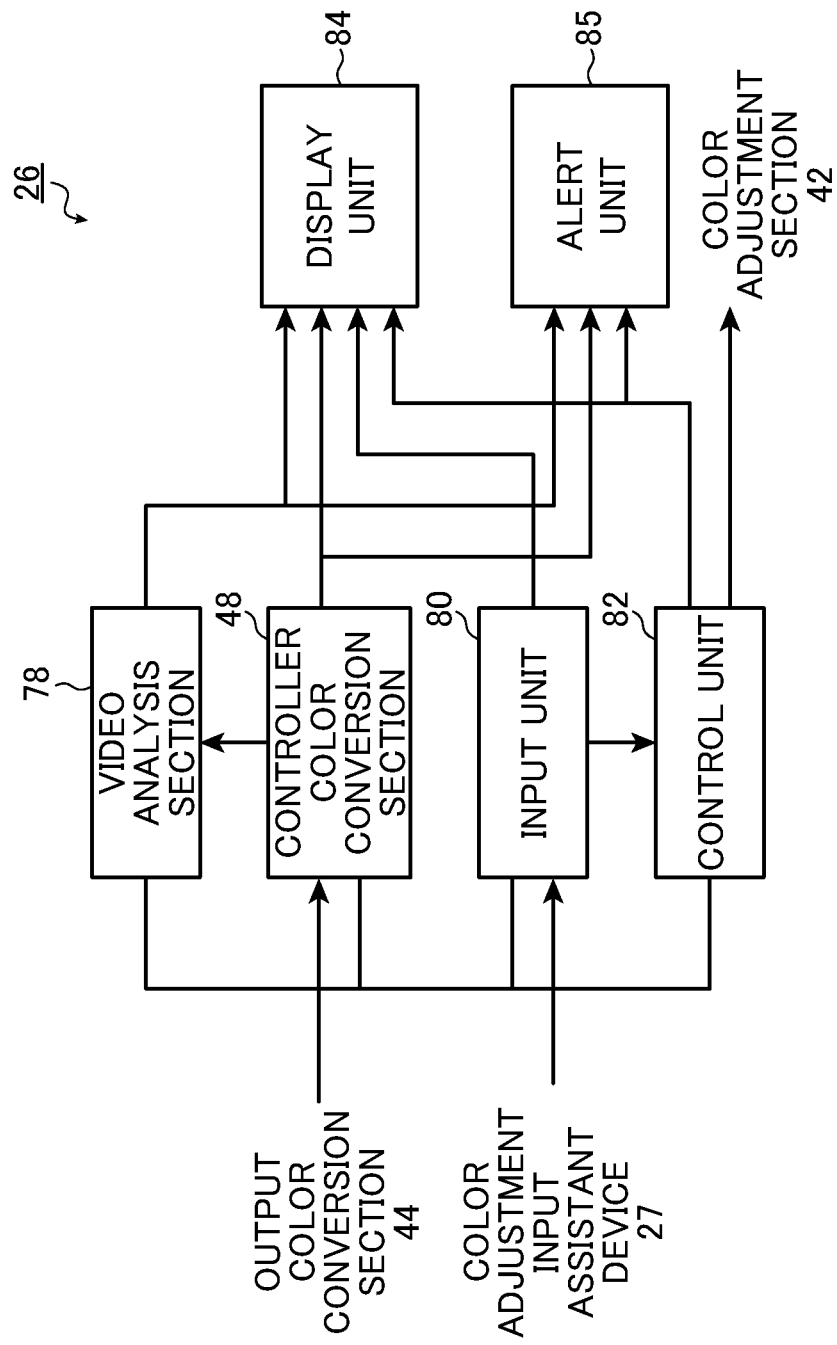
FIG. 3 is a block diagram schematically illustrating an example of a configuration of a controller of the video conversion device shown in FIG. 1.

FIG. 3 is a block diagram schematically illustrating an example of the configuration of the controller shown in FIG. 1.

Figure 4:
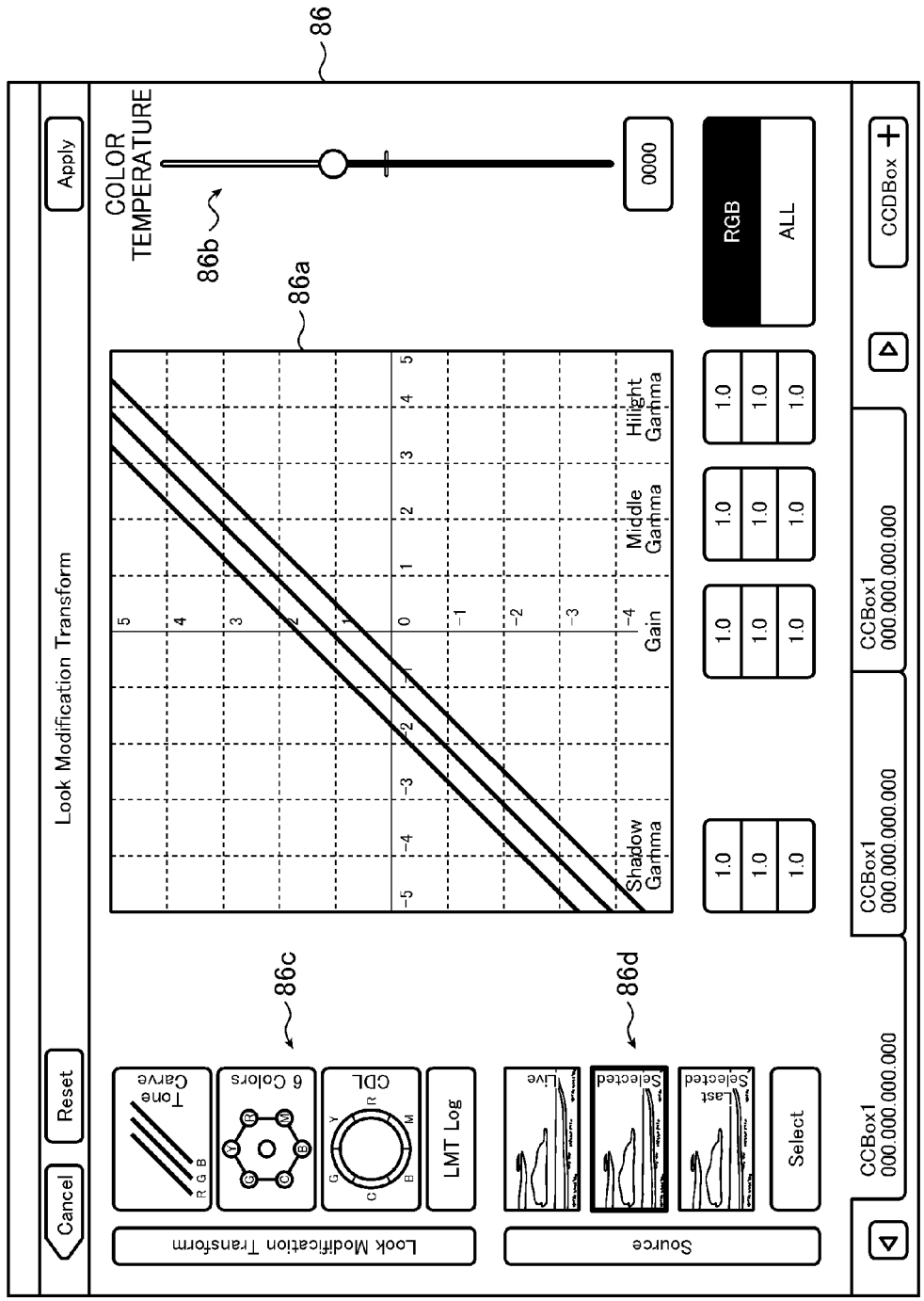
FIG. 4 is a schematic diagram illustrating an example of an input screen for color adjustment parameters of a display unit of the controller shown in FIG. 3.
Figure 5:
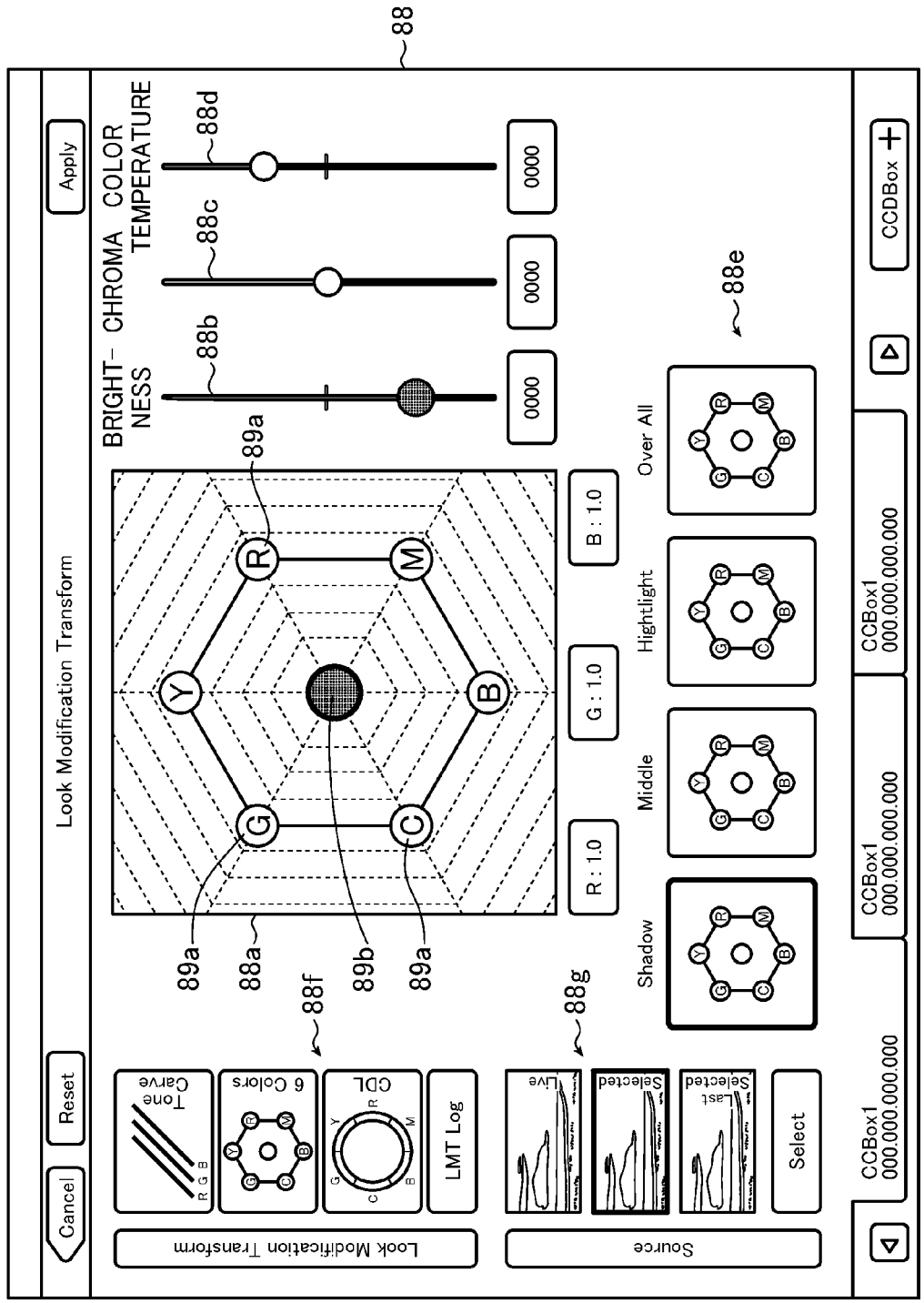
FIG. 5 is a schematic diagram illustrating another example of the input screen for color adjustment parameters of the display unit of the controller shown in FIG. 3.
Figure 6:
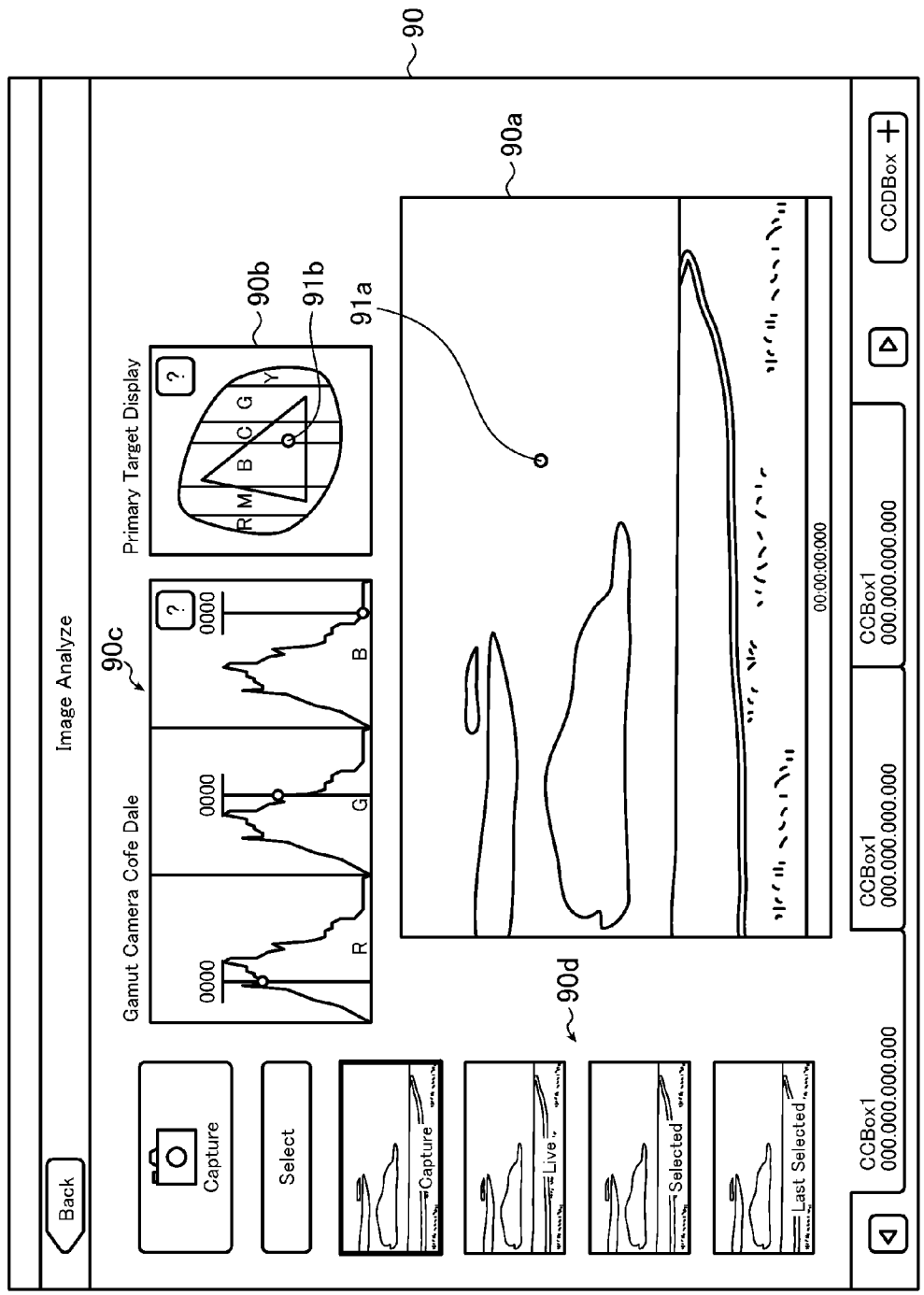
FIG. 6 is a schematic diagram illustrating an example of a display screen for displaying a result of video analysis of the display unit of the controller shown in FIG. 3.
Figure 7:
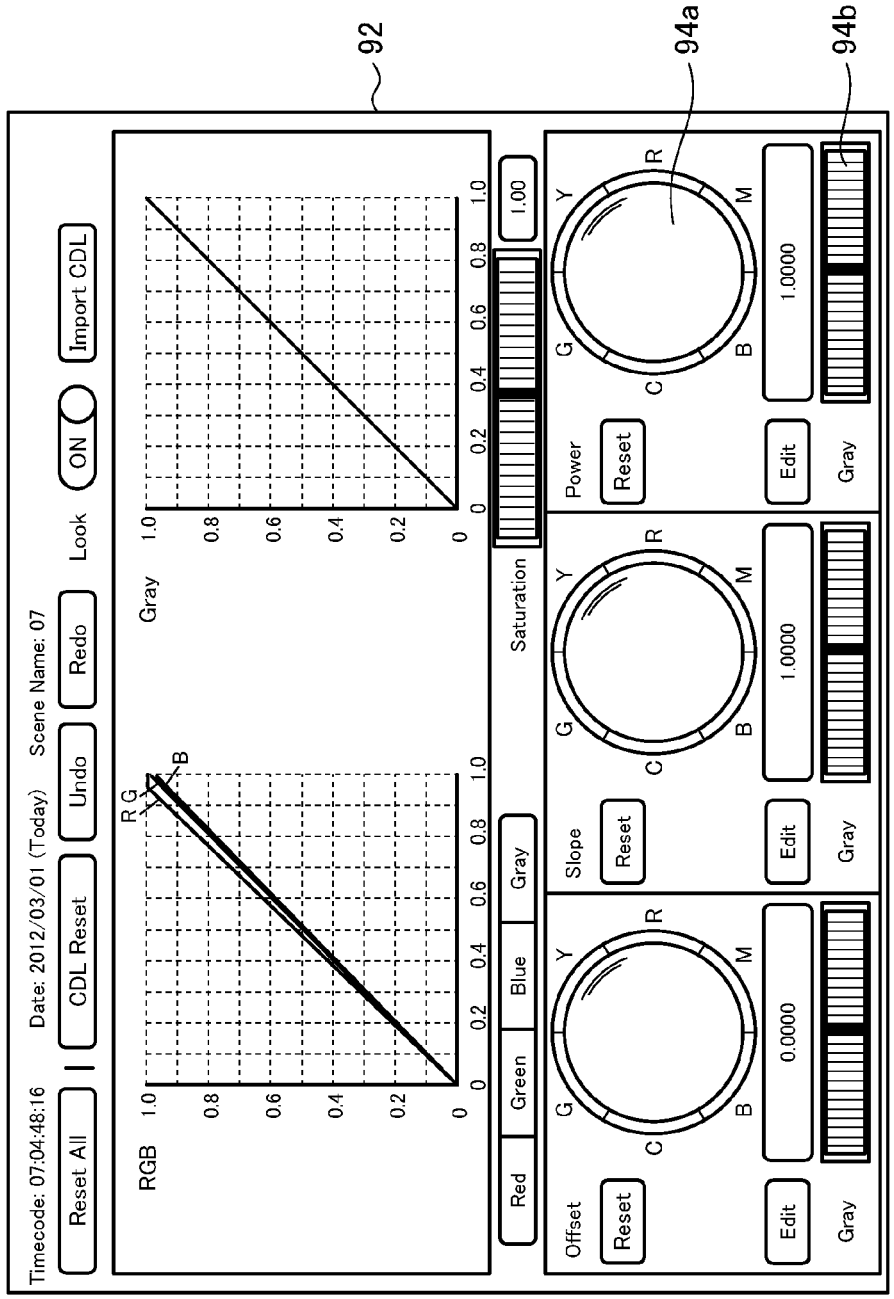
FIG. 7 is a schematic diagram illustrating another example of the input screen for color adjustment parameters of the display unit of the controller shown in FIG. 3.
Figure 8:
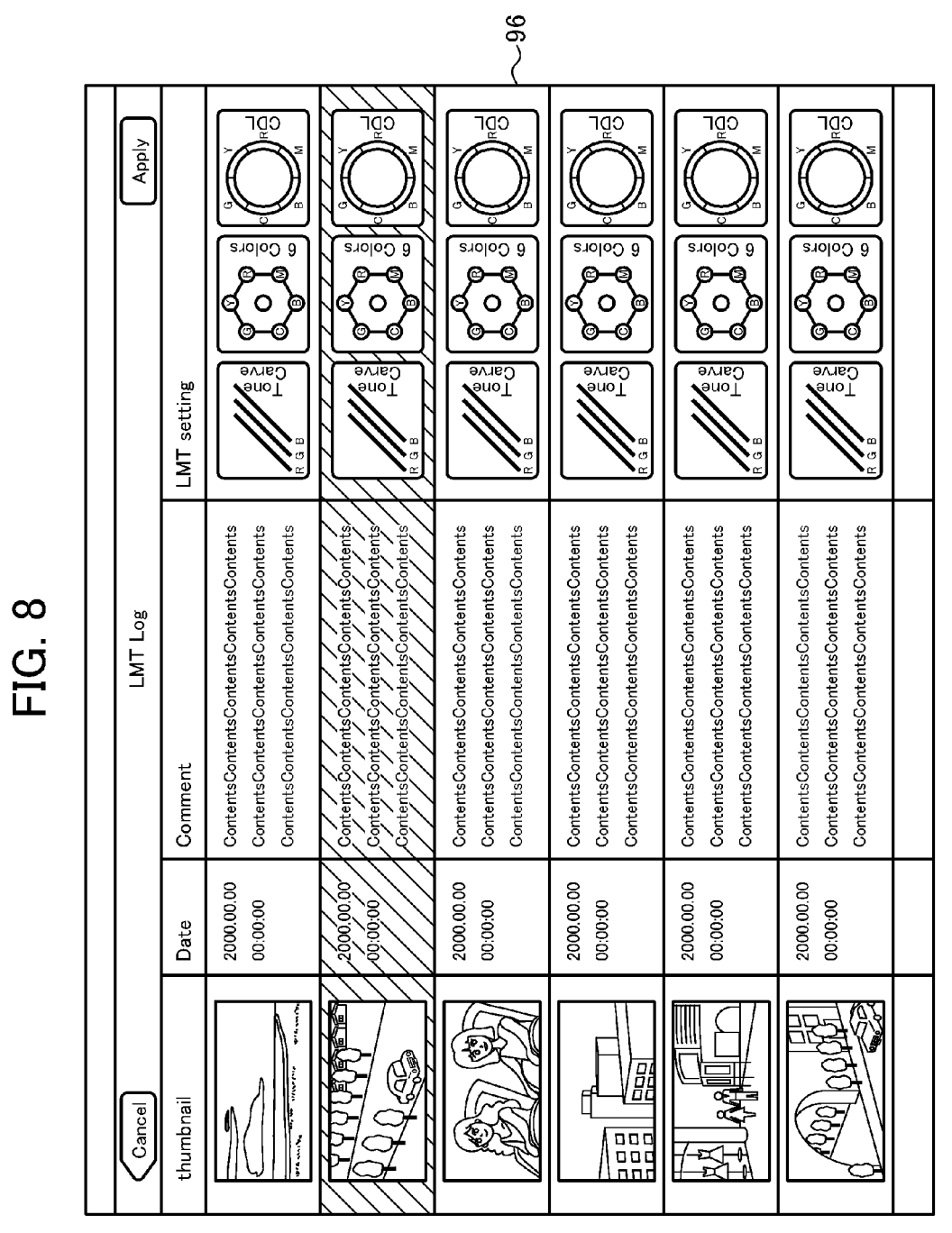

FIGS. 4, 5, and 7 show input screens for color adjustment parameters of the display unit of the controller shown in FIG. 3, FIG. 6 shows a display screen for displaying video analysis results of the display unit of the controller shown in FIG. 3, and FIG. 8 shows a display screen for displaying an example of a previous color adjustment information list of the display unit of the controller shown in FIG. 3.

The controller 26 includes the controller color conversion section 48 shown in FIG. 2, a video analysis section 78, an input unit 80, a control unit 82, a display unit (display) 84, and an alert unit 85.

As described above, the controller color conversion section 48 serves to color-convert video data in the output standard color space (DIC) acquired by the output color conversion section 44 so as to be reproduced as an edited and processed video having the colors of the digital projector which is the final output device of the motion picture system 10 on the display unit 84.

The video analysis section 78 serves to analyze the edited and processed video, which is color-adjusted by the color adjustment section 42 and reproduced on the display unit 84, having the colors of the final output device.

The input unit 80 serves to receive the color adjustment parameters or the like for color adjustment from the color adjustment section 42 and to change display on the display unit 84.

The control unit 82 serves to control the color adjustment in the color adjustment section 42 depending on the color adjustment parameters input from the input unit 80.

The display unit 84 is provided with a display screen for displaying the edited and processed video, which is reproduced on the display unit 84 and has the colors of the final output device, and/or the result of the video analysis performed by the video analysis section 78 and with an input screen for the color adjustment parameters or the like from the input unit 80.

On the display unit 84,

The edited and processed video to be reproduced is not limited to a video having the colors of the digital projector as the final output device of the motion picture system 10, but may be an edited and processed video having the output standard color space (DIC).

Preferably, the display unit 84 displays on the display screen the analysis result of a part selected by the input unit 80 in the edited and processed video color-adjusted by the color adjustment section 42 and displayed on the display screen. It is preferable that the display screen of the display unit is provided with an area in which a video is displayed and an area in which the analysis result of the part selected by the input unit 80 and/or the analysis result of the video in the video analysis section 78 are displayed.

The display unit 84 may display a warning on the display screen when pixels of the video displayed on the display screen depart from the color space of the digital projector as the final output device or when the analysis result of the part selected by the input unit 80 departs from the color space of the digital projector as the final output device.

In addition, the controller 26 may be provided with an alert unit 85 that issues an audible warning when pixels of the color-adjusted video or the color adjustment result of the video, for example, the analysis result of at least the selected part, depart from the color space of the digital projector as the final output device, or the like.

Specific examples of a display screen and an input screen of the display unit 84 of the controller 26 will be described below.

FIG. 4 shows an example of an input screen as a user interface of an LMT displayed on the display unit 84 of the controller 26 which causes the LNT transform section 62 of the color adjustment section 42 of the video conversion device 20 to perform the color adjustment. The LMT input screen 86 is displayed on the display unit 84 of the controller 26 and a user can carry out the color adjustment using the input unit 80 of the controller 26. The input screen 86 serves to adjust gray-scale characteristics of a video, allowing arbitrary adjustment of a tone curve of a video conversion characteristic graph (input: before adjustment, output: after adjustment) 86a. Accordingly, it is possible to control the respective gray-scale slopes of overall brightness, highlight, halftone, and shadow. The color temperatures thereof can be adjusted by adjusting a brightness slide bar 86b on the right side of a screen.

FIG. 5 is a control screen that can adjust hue, brightness, and chroma of primary colors (RGB) and secondary colors (CMY) in the highlight area, the halftone area, and the shadow area. In the input screen 88, when markers 89a of six colors of RGBCMY in a central marker area 88a move, the chroma decreases toward the center of six colors, the chroma increases toward the distal end from the center, and the color is changed to a corresponding color-tinged hue with movement to be closer to another color. By causing a gray marker 89b at the center to move, color balance can be changed.

By adjusting a left brightness slide bar 88b on the right side of the screen in a state where each marker 89a is selected, the brightness of a color can be adjusted. Similarly, the chroma of a color may be adjusted by adjusting a central slide bar 88c on the right side of the screen, and the color temperature of a color may be adjusted by adjusting a slide bar 88d on the rightmost side of the screen.

Icons 88e represent that in which of a shadow area (Shadow), a middle area (Middle), a highlight area (Highlight), and an overall area (Over All), the color adjustment is performed.

The area 86d shown in FIG. 4 and the area 88g shown in FIG. 5 are parts for changing an image to be displayed on a preview monitor screen 90 shown in FIG. 6 and represent that switching of thumbnail display of a live video under shooting (Live), thumbnail display of a still image acquired and set at the time of pressing a selection button (Select) (Selected), and thumbnail display of a still image selected last (Last Selected) can be performed. When the display of a live video is selected, the color adjustment can be applied to a video under shooting and the color-adjusted video can be displayed in real time.

Icons 86c shown in FIG. 4 and icons 88f shown in FIG. 5 allow selection of a color adjustment method in the display unit 84 of the controller 26, and an input screen 86 for tone curve adjustment Tone Curve shown in FIG. 4, an input screen 88 for six color adjustment 6Colors shown in FIG. 5, and an input screen 92 for CDL adjustment CDL shown in FIG. 7 can be selected. When an LMT log button (LMT Log) is pressed, previous adjustment values can be applied/edited to a current video by displaying a previously-prepared color adjustment information list and selecting/applying the list, as shown in FIG. 8.

FIG. 7 shows an input screen 92 for CDL adjustment displayed on the display unit 84 of the controller 26. Color adjustment parameters (offset, gamma, gain, and chroma) of the CDL can be changed by controlling turning of a track ball 94a or a dial 94b.

FIG. 8 shows a display screen 96 for displaying a previously-prepared color adjustment information list displayed on the display unit 84. A list of plural thumbnails of color-adjusted still images, color adjustment dates, details of the color adjustment, and the LMT set values (the same as icons 86c and 88f shown in FIGS. 4 and 5) is displayed on the display screen 96.

The operability can be improved by connecting the color adjustment input assistant device 27 shown in FIG. 9 to the controller 26 or the video conversion device 20 and reflecting the manipulation of the color adjustment input assistant device 27 in a control GUI (such as a degree of turning of a track ball or a dial, graphs, and numerical values) in the color adjustment screen of the controller 26.

FIG. 6 shows an example of a display screen for analyzing a captured video of the display unit 84 of the controller 26.

By designating a pixel 91a of a video 90a on the display screen 90 by the use of a mouse or the like of the input unit 80, the position of the pixel (portion) 91b on an image histogram 90c can be seen. A graph 90b at the center is a gamut (color reproduction gamut)-departure determination graph and it can be seen therefrom whether the pixel departs from the color reproduction range of the display. By checking the gamut-departure determination for each step of a video conversion flow, it is possible to check in which step a pixel departs from the gamut. A left area 90d of the display screen 90 is a part for changing an image to be displayed on the display screen 90, similarly to the areas 86d and 88g shown in FIGS. 4 and 5, and allows switching of camera-acquired image Capture in addition to the live video display Live, the display Selected of a still image selected with a selection button, and the display Last Selected of a still image selected last.

Accordingly, this display screen can be used to determine changing of shooting conditions in a step of camera input, and can be used to review and determine adjustment of the LMT transform section 62 in the output standard color space (DIC) 66. In the monitor video data (MCV) 72 or the controller display video (CCV), the display screen cannot be displayed on the monitor 22 used for preview but it can be seen that the pixel is in the color reproduction gamut in a step of final output.

Since the step of the video conversion flow and the color space displayed on the gamut-departure determination graph do not need to agree with an image displayed below, only the step in the graph can be switched in a state in which a video is maintained as a video suitable for evaluation and appreciation by normally displaying the MCV.

By enabling selection of an area as well as a pixel of an image, in which range of a histogram or a gamut pixels of a selected area are distributed may be displayed.

In this embodiment, the color adjustment value and/or the color adjustment reference table (such as the CDL and the 3DLUT) in the color adjustment section 42 and/or the low-resolution and/or compressed image of the edited and processed video which is color-adjusted by the color adjustment section 42 and has the colors of the final output device or the output standard color space are preferably output to the display unit 84 of the controller 26, the data output unit 50 or the monitor output unit 52 (monitor 22) of the video conversion device 20, or other output units.

In addition, in this embodiment, it is preferable that the color adjustment value and/or the color adjustment reference table in the color adjustment section 42 and/or the edited and processed video, which is color-adjusted by the color adjustment section 42 and has the colors of the final output device or the output standard color space, or the low-resolution image thereof be output to the display unit 84 of the controller 26, the data output unit 50 or the monitor output unit 52 (monitor 22) of the video conversion device 20, or other output units in correspondence with the date and/or the time code at the time of shooting. That is, it is preferable that a color adjustment information file (such as a CDL or an EDL) in which the time codes or the like is made to correspond to the color adjustment value and/or the color adjustment reference table be output.

In the present invention, the process flow in the video conversion device shown in FIG. 2 can be performed as a video conversion method.

That is, the video conversion method according to the present invention can be performed by acquiring a camera video data signal captured with a camera, converting the camera video data signal into a scene-referred color space captured with the camera to acquire video data of a first image in the scene-referred color space, performing color adjustment on the video data of the first image to acquire the color-adjusted video data of the first image, converting the color-adjusted video data of the first image into a standard color space for video output to acquire video data of a second image in the standard color space for output, and converting the video data of the second image into a color space of a display device for checking to acquire video data of a third image in the color space of the display device for checking so as to check colors obtained in a final output device when the video data of the second image is converted into a color space of the final output device, from which a video is finally output, with a different display device in advance.

The above-mentioned video conversion method can be performed by a computer by executing a video conversion program.

For example, the video conversion program according to the present invention includes procedures causing a computer, specifically, a CPU thereof, to perform the respective steps of the video conversion method. The program including the procedures may be constructed as a single program module or plural program modules.

The video conversion program including the procedures performed by a computer may be stored in a memory (storage device) of a computer or a server, may be stored in a recording medium, or may be read and executed from a memory or a recording medium by the computer (CPU) or another computer at the time of execution. Therefore, the present invention may be embodied as a computer-readable memory or recording medium having recorded thereon the video conversion program causing a computer to perform the video conversion method.

While the video conversion device according to the present invention, the photography system for a motion picture system employing the video conversion device, the video conversion method, and the recording medium having recorded thereon the video conversion program, have been described in detail, the present invention is not limited to the above-mentioned embodiments and may be improved or modified in various forms without departing from the gist of the present invention.

What is claimed is:

1. A video conversion device which is used in a photography system for capturing a video with a camera in a motion picture system in which a projection image is prepared from a camera video data signal captured with the camera, the video conversion device comprising:
   a camera video signal acquiring unit acquiring the camera video data signal;
   a first color conversion unit converting the camera video data signal into a scene-referred color space captured with the camera to acquire video data of a first image in the scene-referred color space;
   a color adjustment unit performing color adjustment on the video data of the first image to obtain the video data of the first image as color-adjusted;
   a second color conversion unit converting the video data of the first image as color-adjusted into a standard color space for video output to acquire video data of a second image in the standard color space for output;
   a third color-space conversion unit converting the video data of the second image into a color space of a display device for checking to acquire video data of a third image in the color space of the display device for checking so as to check colors obtained in a final output device when the video data of the second image is converted into a color space of the final output device, from which a video is finally output, with a different display device in advance; and
   a processor connecting the first color conversion unit, the second color conversion unit, and the third color-space conversion unit with the color adjustment unit to perform image processing in real time,
   wherein an editing information file having details of editing and processing including the color adjustment by the color adjustment unit is transmitted to a video production system along with a time code of the video data of the third image, the video production system being a system of post-production in the motion picture system,
   the video data of the third image is low resolution video data, and
   the standard color space for output is a color space not depending on an output device.

2. The video conversion device according to claim 1, wherein the final output device is a projector screening the projection image in the motion picture system in which the projection image is prepared from plural types of the camera video data signals captured with a plurality of the cameras,
   wherein the video conversion device is connected to the plurality of the cameras or connected to the plurality of the cameras in a one-to-one correspondence manner and is connected to a plurality of the display devices for checking or connected to the plurality of the display devices for checking in a one-to-one correspondence manner, and
   wherein the display devices for checking are used to check colors in the final output device on a shooting side of the motion picture system.

3. The video conversion device according to claim 1, wherein the standard color space for output is an output color space in which an ideal output device having a dynamic range of 10000:1 or more is assumed, an output color space in which a standard output device is assumed, or an output color space in which a preview of a projection film to be screened with a projector in a motion picture system is assumed.

4. The video conversion device according to claim 1, wherein the camera is a digital video camera or a digital camera with which a video of a subject is shot to acquire the camera video data signal.

5. The video conversion device according to claim 1,
   wherein a controller includes a display unit, a controller color conversion unit, a video analysis unit, a control unit, and an input unit,
   wherein the controller color conversion unit performs color conversion for reproducing, on the display unit, the video data of the second image in the standard color space for output acquired by the second color conversion unit as an edited and processed video having the colors in the final output device, wherein the video analysis unit analyzes the edited and processed video having the colors in the final output device that has been color-adjusted by the color adjustment unit and reproduced on the display unit, wherein the input unit is used to input a color adjustment parameter for the color adjustment by the color adjustment unit and to change display on the display unit, wherein the control unit controls the color adjustment in the color adjustment unit depending on the color adjustment parameter input through the input unit, and wherein the display unit is provided with a display screen on which the edited and processed video having the colors in the final output device that is to be reproduced on the display unit and/or a result of video analysis by the video analysis unit is displayed, and an input screen to which the color adjustment parameter is input through the input unit.

6. The video conversion device according to claim 5, wherein the display unit displays an analysis result of a part of the edited and processed video as color-adjusted by the color adjustment unit and displayed on the display screen, which part is selected through the input unit, on the display screen.

7. The video conversion device according to claim 6, wherein the display screen of the display unit has an area for displaying the video and an area for displaying the analysis result of the part selected through the input unit and/or the result of the video analysis in the video analysis unit.

8. The video conversion device according to claim 6, wherein the display unit displays a warning on the display screen when pixels of the video depart from the color space of the final output device or when the analysis result of the part selected through the input unit departs from the color space of the final output device.

9. The video conversion device according to claim 6, wherein the controller further includes an alert unit issuing an audible warning when pixels of the video depart from the color space of the final output device or when the analysis result of the part selected through the input unit departs from the color space of the final output device.

10. The video conversion device according to claim 6, wherein the controller is connected to the color adjustment unit via a line and causes the color adjustment unit to perform the color adjustment depending on the color adjustment parameter based on control of the control unit.

11. The video conversion device according to claim 1, further comprising an output unit outputting a color adjustment value and/or a color adjustment reference table from the color adjustment unit and/or a low-resolution and/or compressed image of an edited and processed video having the colors in the final output device or the standard color space for output, which video has been color-adjusted by the color adjustment unit.

12. The video conversion device according to claim 1, wherein a color adjustment value and/or a color adjustment reference table from the color adjustment unit and/or an image of an edited and processed video as color-adjusted by the color adjustment unit is output as associated with a date and/or a time code upon shooting.

13. A photography system for a motion picture system, comprising:
a plurality of cameras;
a plurality of video conversion devices that are so disposed as to correspond to the plurality of cameras, respectively;
checking display devices that are so disposed as to correspond to the plurality of the video conversion devices, respectively;
a captured video storage device storing the camera video data signals captured with the plurality of cameras; and
an edited and processed video storage device storing a low-resolution image of an edited and processed video having the colors in the final output device that has been color-adjusted by the color adjustment unit,
wherein each of the video conversion devices includes
a camera video signal acquiring unit acquiring the camera video data signal,
a first color conversion unit converting the camera video data signal into a scene-referred color space captured with the camera to acquire video data of a first image in the scene-referred color space,
a color adjustment unit performing color adjustment on the video data of the first image to obtain the video data of the first image as color-adjusted,
a second color conversion unit converting the video data of the first image as color-adjusted into a standard color space for video output to acquire video data of a second image in the standard color space for output,
a third color-space conversion unit converting the video data of the second image into a color space of a display device for checking to acquire video data of a third image in the color space of the display device for checking so as to check colors obtained in a final output device when the video data of the second image is converted into a color space of the final output device, from which a video is finally output, with a different display device in advance, and
a processor connecting the first color conversion unit, the second color conversion unit, and the third color-space conversion unit with the color adjustment unit to perform image processing in real time, and
wherein the video conversion devices each transmit an editing information file having details of editing and processing including the color adjustment by the color adjustment unit described therein to a video production system, which is a system of post production in the motion picture system, along with a time code of the video data of the third image,
the video data of the third image is low resolution video data, and
the standard color space for output is a color space not depending on an output device.

14. A video conversion method which is performed in a photography system for capturing a video with a camera in a motion picture system in which a projection image is prepared from a camera video data signal captured with the camera, comprising:
acquiring the camera video data signal;
converting, by a first color conversion unit, the camera video data signal into a scene-referred color space captured with the camera to acquire video data of a first image in the scene-referred color space;
performing color adjustment on the video data of the first image to obtain the video data of the first image as color-adjusted;
converting, by a second color conversion unit, the video data of the first image as color-adjusted into a standard color space for video output to acquire video data of a second image in the standard color space for output;
converting, by a third color-space conversion unit, the video data of the second image into a color space of a display device for checking to acquire video data of a third image in the color space of the display device for checking so as to check colors obtained in a final output device when the video data of the second image is converted into a color space of the final output device, from which a video is finally output, with a different display device in advance; and connecting the first color conversion unit, the second color conversion unit, and the third color-space conversion unit with the color adjustment unit to perform image processing in real time, wherein an editing information file having details of editing and processing including the color adjustment is transmitted to a video production system, which is a system of post production in the motion picture system, along with a time code of the video data of the third image, the video data of the third image is low resolution video data, and the standard color space for output is a color space not depending on an output device.

15. A non-transitory computer-readable recording medium having recorded thereon a video conversion program causing a computer to perform respective procedures of the video conversion method according to claim 14.

* * * * *